United States Patent Office

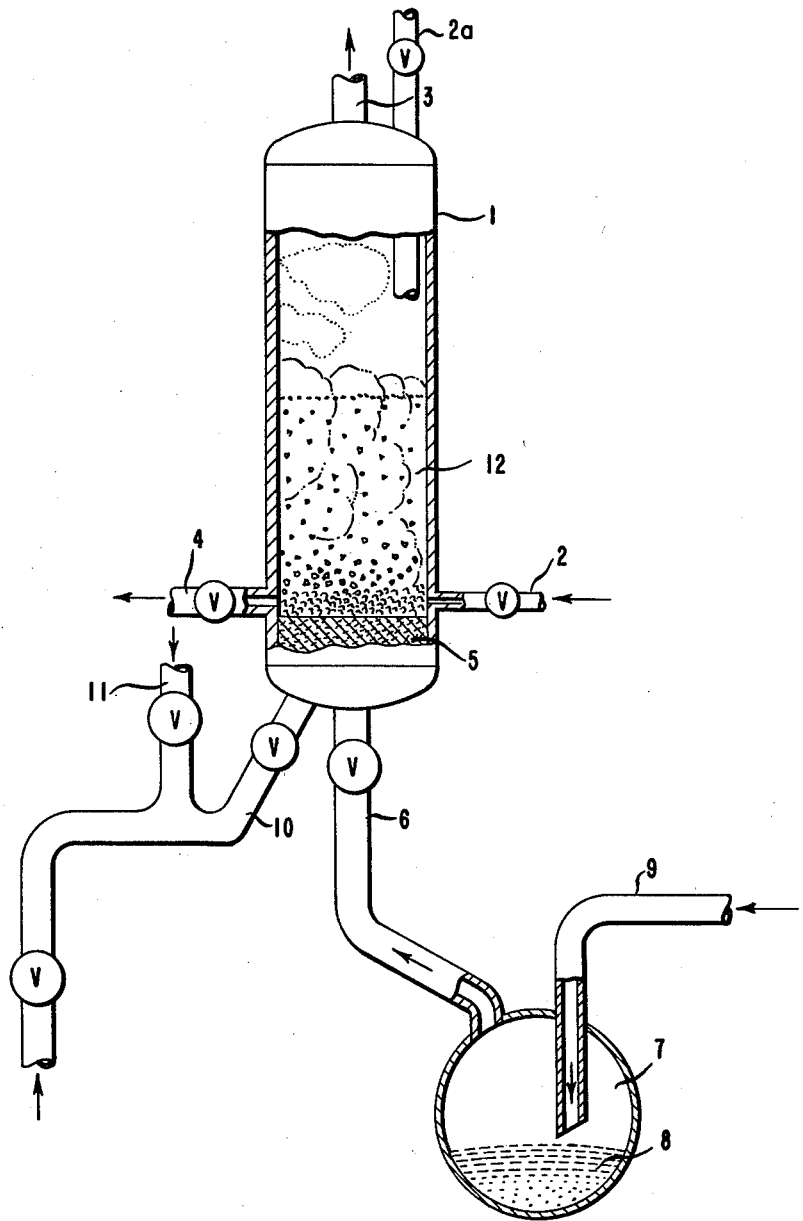

3,190,723
Patented June 22, 1965

3,190,723
PROCESS FOR PRODUCING METAL OXIDES IN PREDETERMINED PHYSICAL FORMS
Howard W. Jacobson, Wilmington, Del., assignor to E. I. du Pont de Nemours and Company, Wilmington, Del., a corporation of Delaware
Filed Oct. 17, 1961, Ser. No. 145,592
12 Claims. (Cl. 23—140)

This invention relates to the production of the oxides of the elements chromium, columbium, iron, molybdenum, tantalum, titanium, tungsten, vanadium, and zirconium.

More particularly, it relates to a process in which a halide of the above-specified elements is reduced in the presence of carbon to form a carbide which is then converted to an oxide having the same shape or configuration as the carbon initially used in the process.

The process of this invention comprises reacting in an enclosed reaction zone carbon, a volatile halide of an element from the group consisting of chromium, columbium, iron, molybdenum, tantalum, titanium, tungsten, vanadium, and zirconium, and a reducing agent from the group consisting of aluminum, hydrogen, and combinations thereof. The carbon should be in the form or shape desired in the oxide end product. By carrying out the reduction of the halide in the presence of the carbon, there is formed the carbide of the element being reduced. This carbide can then be subjected to contact with oxygen to convert it to an oxide, and this oxide will possess the original shape or configuration of the carbon used in the reduction reaction. In instances where the oxides of chromium, titanium, or zirconium are being produced, the reducing agent should be either aluminum alone or a mixture of aluminum and hydrogen. Hydrogen by itself will not completely reduce the halides of these elements all the way to the metal. With these metals, the use of hydrogen will only effect a partial reduction to the lower halides. Reaction temperatures to form the carbides are in the range of about 700° C. to about 950° C., and temperatures in the range of about 500° C. to 1000° C. may be used to form the oxides.

Preferably, the carbon is present in the reactor as a fluidized bed of carbon particles. In cases where aluminum is used as the reducing agent or as one of the reducing agents, there should be present in the reactor a bed of inert material, for example, alumina or silica; or an alloy of titanium and aluminum or of zirconium and aluminum. When both carbon and an additional bed material are present, particle size and the comparative densities of the additional bed material and the carbon are such that the carbon particles are, for the most part, located in the upper part of the bed, while the non-carbon bed particles largely contitute the bottom portion of the bed. There will, of course, be some intermixing of particles of the two materials. When aluminum is used as the reducing agent, it is fed through an inlet at or near the top of the reactor. The volatile halide used to produce the element for carbide formation is fed through an inlet at the bottom of the reactor together with a sufficient flow of an inert gas, to maintain the bed in a fluidized condition. In cases where hydrogen is used as the reducing agent, or as one of a combination of reducing agents, a flow of hydrogen may be maintained in admixture with the inert gas feed, or it may be introduced separately to the reactor. The oxidation of the carbides may be carried out without removing the carbides from the reactor. This can be easily accomplished by introducing a gas containing free oxygen into the reactor while maintaining the temperature of the reactor sufficiently high to effect the oxidation. Alternatively, the carbide may be removed from the reactor and subsequently heated in an oxygen-containing atmosphere to produce the oxide structures.

The attached drawing illustrates an apparatus which can be used to carry out the process of this invention.

This drawing shows a vertically disposed, cylindrical-type reactor 1 which can be composed of pure silica, silica glass, stainless steel or other material which, under prevailing reduction conditions, will not be attacked by the reactants, products, and reaction by-products. The reactor is provided with inlet conduits 2 and 2a, and outlet conduits 3 and 4. Conventional-type electrical or other desired furnacing means can be externally associated with the reactor to heat and maintain it and its contents at temperatures ranging from about 700° C. to 900° C. Suitably disposed in the bottom or lower portion of the reactor, and functioning to support or retain the fluidizable bed particles 12 when in repose therein, is a perforated grid or porous filter 5 which is also composed of a material which is inert to the action of the gases fed into the reactor. Also provided in the bottom of the reactor is a valve-controlled inlet conduit 6 which is in open communication with a generator or vaporizer 7 and through which a vaporized compound of the element to be reacted with the carbon can be fed. The vaporizer can be enclosed within or otherwise suitably associated with an electrical or other form of desired heating means to maintain it at any desired temperature and effect vaporization of a volatile metal compound 8 previously charged thereto via a conduit 9. The conduit 9 can also be used to introduce an inert carrier gas (argon, helium, etc.) along with the vaporized compound to be reduced. A separate valve-controlled inlet conduit 10 is also provided in the reactor bottom, through which hydrogen is charged to the reactor. An associated valve-controlled auxiliary conduit 11 communicates with the conduit 10 through which an inert gas diluent (argon, helium, etc.) can be mixed with the hydrogen reducing-gas feed when assistance and promotion of the fluidization of bed particles in the reactor is desired. When a reaction is being carried out in which only a gaseous reducing agent is employed, the valve in the inlet conduit 2a may be closed. When a metallic reducing agent is employed, this may be added through the inlet conduit 2a. If a combination of gaseous and metallic reductants is used, these may be fed through both conduit 2a and conduit 10. Outlet 4 may be used to discharge the bed, or portions thereof, from the reactor. The bed material 12 may be carbon and/or an inert material such as alumina or silica of $-20$ to $+120$ mesh; or it may be composed of particles of carbon and an alloy of aluminum and titanium or of aluminum and zirconium. When the process of this invention is being used to produce the carbide of any of the metals named above whose compounds are completely reducible by means of hydrogen, or when a combination of these carbides is being produced, the reaction may proceed without the use of inert bed materials. However, if a combination of metallic and gaseous reducing agents is to be employed, at least a portion of the bed material should be inert particles in order to provide surface upon which the reduction of the volatile compound by the metal reducing agent may take place. Alternatively, the bed may be composed solely of inert particles, and the carbon may be hung in the reactor above the bed of inert material. The carbon used should be in the shape desired in the final product. In certain uses, this may mean irregularly shaped particles which can be used as part of the fluidized bed. In other instances, the carbon to be converted to oxide may be woven or felted material. When such materials are used, they are usually hung in the reactor above the fluidized bed. Carbons possessing a honeycomb structure have been used to produce oxide particles having such a structure. These honeycomb particles can be crushed into acicular particles which are useful as reinforcing materials for ceramics, metals, and plastics.

In operating the apparatus shown in the drawing, a continuous flow of inert gas is begun through conduit 10, so that the bed becomes fluidized. The particle size of the carbon material, if the carbon is to be a part of the fluidized bed, should be so chosen that this portion of the bed will be lighter and will remain, for the most part, segregated above the inert bed. The reactor 1 and bed 12 are then brought to a preferred operating temperature in the range of about 700° C. to about 950° C., depending on the composition of the carbide product to be prepared, the rate of gas flow, the size of the reactor, heat losses, and other related factors. The reactor is heated to the desired temperature by applying external heat through the associated furnacing means. A portion of the heat required for the reaction may be supplied by preheating the gases which are fed through conduit 10. When the desired bed temperature is reached, a flow of volatile compound to be reduced, preferably one or more volatile halides, for example, silicon tetrachloride, titanium tetrachloride, tungsten hexachloride, or zirconium tetrachloride, or a combination of volatile compounds to be reduced, is begun from the vaporizer 7 through conduit 6 to the reactor. If a metal reducing agent is to be used, this is fed through inlet conduit 2a. The rate of introduction of the metal is controlled so that unreacted molten metal does not build up and cause the bed particles to stick together.

Where the volatile compound to be reduced is a halide of chromium, columium, iron, molybdenum, titanium, tantalum, tungsten, vanadium, or zirconium, either a metal reducing agent, or a combination of metal reducing agent and hydrogen may be used as the reductant. If a halide of columbium, iron, molybdenum, tantalum, tungsten, or vanadium is to be reduced, hydrogen alone has been found to be quite satisfactory at temperatures in the range of 700–950° C. However, if the reduction of a tungsten halide is to be carried out in the reactor at a temperature below about 700° C., or an increase in yield of tungsten when operating at a higher temperature is desired, a combination of metallic and gaseous reducing agents may be used.

The amount of reducing agent which is used in the operation of this invention is not particularly critical. The amount used should be in excess of the stoichiometric quantity required to completely reduce the volatile halides to the metal which is to be combined with the carbon, but the excess need be only a slight excess. When a combination of the two reducing agents hydrogen and aluminum is used, the aluminum acts as the predominant reductant. Therefore, to insure good yields when using a combination of reducing agents, it is advisable to employ at least a stoichiometric quantity of aluminum to effect reduction of the halide to the metal for subsequent reaction with the carbon. The aluminum used may be in the form of an alloy with the same metal as is found in the halide reactant.

Although in the preferred method of operation of this invention, the carbide formation is carried out in a fluidized bed reactor, it is entirely possible to employ a fixed bed within a reactor and to locate at or near the exit of the reactor the material to be made into carbide. It would be possible to carry out the reaction by supplying a fixed bed of particles of Ti-Al alloy. An alloy of Ti and Al is easily prepared by arc melting the metals together and crushing the alloy product. Titanium tetrachloride should be introduced into the fixed bed reactor upstream of this TiAl bed. The carbon object or objects to be formed into carbides should be placed near or at the exit end of the reactor. The amounts of reactants and the temperatures of operation for such a fixed bed would be the same as for the operation of a fluidized reactor. In a similar manner, a Zr-Al alloy might be used as a fixed bed within the reactor and $ZrCl_4$ fed into the reactor upstream of the alloy to form zirconium carbide in any desired shape. If hydrogen is to be used as one of the reductants in the reaction, it may be introduced along with the metal halides.

The method by which the reduction of the volatile halide and the subsequent formation of the carbide takes place is not completely understood. However, it is believed that the reducing agent and the volatile halide react to form partially reduced compounds. The presence of an inert bed material provides surfaces whereon the reduction reaction may take place. As these partially reduced compounds come in contact with additional reducing agent in the presence of the carbon in the upper portion of the reactor, further reduction takes place so that metal is formed which then reacts with the surface of the carbon to form a carbide. This carbide in the shape of the original carbon can then be contacted with oxygen to form a carbide still in the shape of the original carbon.

For a clearer understanding of the invention, the following specific examples are given. These examples are intended to be merely illustrative of the invention and not in limitation thereof. Unless otherwise specified, all parts are by weight.

*Example I*

This example illustrates the formation of $TiO_2$ using aluminum as the reducing agent.

A cylindrical silica reactor, as shown in the drawing, 41 mm. in diameter and 30.5 cm. in length, was used in this example. This reactor was charged with 100 g. of Alundum of particle size −90 +120 mesh, and on top of these particles, there was placed 35 g. of activated wood charcoal of particle size −20 +40 mesh. By means of external heating, the reactor temperature was brought to 825° C. while a flow of argon of 2.0 liters per minute (measured at room temperature) was used to fluidize the bed of Alundum and carbon. With the reactor temperature maintained at 825° C., a feed of $TiCl_4$ was begun through the bottom inlet feed of the reactor while at the same time a feed of aluminum particles (−40 +60 mesh) was begun through the top-feed inlet. Over a period of 2 hours, a total of 124 g. of $TiCl_4$ was vaporized to the reactor, and 25 g. of Al was fed through the top inlet. After 2 hours, the feed of Al through the top inlet was discontinued. Heating was also discontinued and a flow of air (2.0 liters/minute) was substituted (through conduit 10) for vaporized $TiCl_4$ and argon. The air feed was maintained for a period of ½ hour. As soon as the air feed to the reactor was begun, the reactor contents began to glow, and the temperature of the reactor rose rapidly to 975° C. The glowing of the bed continued for about 5 minutes. At the conclusion of ½ hour, the reactor and its contents were cooled to room temperature. The bed was removed from the reactor and screened to separate the Alundum which is of smaller particle size. The larger-particle-size fraction was composed of 45 gms. of $TiO_2$ particles. The composition of these particles was confirmed by X-ray diffraction analysis to be the rutile crystal form of $TiO_2$. These particles were in the same configuration as the original carbon particles in the bed, and the 45 gm. yield is an 87% conversion to $TiO_2$ of the Ti values initially fed to the reactor as $TiCl_4$.

The $TiO_2$ particles thus produced were lightly crushed in a mortar. Cleavage along the longitudinal axes resulted, breaking down the oxide into acicular particles having a length-to-width ratio of about 25:1 to about 50:1.

*Example II*

This example illustrates the production of $TiO_2$ particles by the use of a combination of solid (Al) and gaseous ($H_2$) reducing agents.

Using the same reactor and the same general procedure as is described in Example I, a bed of 100 g. of Alundum and, above this, 25 g. of activated wood charcoal, was fluidized by a flow of 1.0 liter per minute of argon. The temperature of the bed was raised to 800° C. and a flow of 0.5 liter per minute of hydrogen was added to the fluidizing gas feed. Over a period of 1¾ hours, 100 g. of $TiCl_4$ vapor was fed through the bottom inlet and 15 g. of aluminum (−40 +60 mesh particle size) was added at the top of the reactor.

At the conclusion of the 1¾ hour run, the reactor was cooled under a flow of argon and the bed removed from the reactor. By screening, the larger-particle-size fraction of the bed, weighing 23 gms. and consisting of TiC particles, was separated from the smaller-particle-size Alundum portion of the bed. 20 grams of these TiC particles were placed in a ceramic boat and heated in a muffle furnace vented to the air. The temperature was raised to about 500° C. At this temperature, the sample began to glow and continued to glow as oxidation proceeded. The temperature was increased to 1000° C. to insure complete oxidation of the sample. The time for this oxidation of the TiC to $TiO_2$ was about ½ hour.

At the conclusion of this time, the sample was furnace cooled. When the oxidized particles were removed from the ceramic boat, they were found to be in the same shape as the original carbon particles used in the fluidized bed reaction. The chemical composition of the product was confirmed by X-ray diffraction analysis. The oxide particles were lightly crushed and cleavage of the particles resulted in the same type of acicular particles as described in Example I.

*Example III*

In this example, $ZrO_2$ was formed in the configuration of the original carbon particles used in the reaction, by reduction of $ZrCl_4$ using a combination of metallic and gaseous reducing agents followed by oxidation of the ZrC first formed. The $ZrO_2$ thus produced was used to make acicular particles of $ZrO_2$.

Following the pocedure of Example I, a bed comprising 100 g. of −90 +120 mesh particle-size Alundum and, above this, 8 g. of activated wood charcoal (−20 +40 mesh particle size) was fluidized by a flow of 1 liter per minute of hydrogen. The temperature of the reactor was maintained at 850° C., and over a period of 30 minutes, 19 g. of $ZrCl_4$ vapor was introduced into the bottom feed inlet of the reactor, and 6 g. of Al (−40 +60 mesh size) was added through the top inlet.

The reactor was then cooled (under inert gas flow) and the bed sieved to separate the different particle-sized fractions. The larger-sized fraction was found to be comprised of gray metallic particles of the same shape as were the carbon particles used in the reactor charge. X-ray diffraction analysis showed the surface of these particles to be ZrC.

Following the same procedure as is given in Example II, 10 grams of the ZrC product of the above reaction was treated in air in a muffle furnace to effect oxidation of the ZrC to $ZrO_2$. The sample began to glow when the temperature had reached about 500° C. The total time the sample was kept in the furnace was ¾ hour. The product of this oxidation reaction was examined by X-ray diffraction procedures and was determined to be $ZrO_2$. The particles were found, upon examination, to be of the same configuration as the original carbon particles. A portion of this $ZrO_2$ product was lightly crushed in a mortar, and it was found that acicular particles of $ZrO_2$ resulted because of cleavage of the particles along the longitudinal axes. The ratio of length to diameter of these particles was in the range of 25:1 to 50:1.

*Example IV*

Using the same reactor and the same general conditions as are described in the previous examples, a reaction was carried out using a bed of 100 g. of Alundum, 10 g. of activated charcoal, a fluidizing gas feed of 1.8 liters per minute of argon and a temperature of 850° C. Over a 40-minute period, 8 g. of aluminum was fed through the top feed inlet and 22 g. of $ZrCl_4$ vapor was fed into the reactor through the bottom inlet. The reactor was then cooled, and the two separate particle-sized bed fractions were recovered by screening. It was found that the larger-sized fraction of the bed had increased 7.1 g. in weight and that the metallic gray particles, still in the shape of the original carbon particles, were composed predominantly of ZrC (X-ray diffraction analysis).

In the same way as is described in Example III, 10 grams of the ZrC product was heated in a muffle furnace. In this case, however, a flow of oxygen at 2 liters/minute was directed to the ZrC sample. An exothermic reaction began to take place at about 500° C. and the sample glowed brightly. The heating was continued for ½ hour and the temperature raised to 1000° C. to insure complete oxidation of the sample.

The boat containing the sample was furnace cooled, and the product was examined visually and by X-ray diffraction analysis. It was found to be $ZrO_2$ in the same configuration as the carbon particles in the original carbon bed. The $ZrO_2$ particles were lightly crushed and acicular particles of $ZrO_2$ were obtained.

*Example V*

This example illustrates the formation of $TiO_2$ in the form of fibers. Following the procedure given in Example I, a bed comprising 100 g. Alundum (−90 +120 mesh particle size) and above this, 8 g. of carbon fibers (commonly referred to as graphite batting) was introduced into a reactor. The bed was fluidized by the introduction of 1.5 liters per minute of argon, and the reactor and its contents were heated to 800° C., and this temperature was maintained during the reaction period. Over a period of 1 hour, 30 grams of $TiCl_4$ vapor was fed to the reactor, and simultaneously, 5.5 g. of aluminum (−40 +60 mesh size) was fed to the reactor through the top inlet. The bed was then cooled under a flow of argon and separated into two portions by screening. The carbon fibers were found to be completely covered by a gray metallic coating which was identified by X-ray diffraction analysis as predominantly TiC. The original shape of the fibers was retained in the carbide product, and an increase in weight of 6 g. was found. A yield of 80% was realized in the recovery of Ti from $TiCl_4$ fed.

The fibers of TiC formed in the manner described above were oxidized by heating in a muffle furnace in a ceramic boat according to the procedure given in Example II. Fibers of $TiO_2$ were formed, these being in the identical configuration as the carbon fibers which were placed in the fluidized bed reactor. The chemical composition of the product was confirmed by X-ray diffraction analysis.

*Example VI*

This example will illustrate the formation of tungsten oxide according to the process of this invention using hydrogen as the reducing agent.

The reactor in this experiment consisted of a silica glass tube, 22 mm. inside diameter and 30.5 cm. in length, and the bed comprised 10 g. of −20 +40 mesh particle size activated charcoal. The reactor and contained bed material were heated to 750° C., while the bed was being fluidized by the upward flow of 1.2 liters per minute of hydrogen. Over a period of 2 hours, 174 g. of $WCl_6$, vaporized from an outside reservoir, was fed through the bottom feed inlet. At the conclusion of the 2-hour reaction time, the reactor and bed were cooled (the flow of hydrogen being continued through this period) and the charge was emptied from the reactor.

The product was of the same shape and particle size as the original carbon placed in the bed. X-ray diffraction analysis showed the presence of three forms of carbide: $\alpha W_2C$, $\beta W_2C$, and WC. The bed weight increased 74 grams during the reaction. This is a 91% yield on the tungsten values fed to the reactor.

Fifty grams of this tungsten carbide product was placed in a ceramic boat and heated in a muffle furnace vented to the air. At a temperature of about 500° C., the sample began to glow and continued to glow for a period of 5 minutes. The temperature was increased to 950° C. and this temperature maintained for 15 minutes to insure complete oxidation of the carbide sample. The ceramic boat with the contained sample was then removed from the furnace and cooled to room temperature. X-ray diffraction analysis of the product showed it to be predominantly $WO_3$. The particles were in the same shape as were the original carbon particles placed in the reactor. These tungsten oxide particles were lightly crushed in a mortar and were found to break along the longitudinal axes in the same manner as did the oxide products described in Examples I through IV. The particles exhibited, in general, a length-to-diameter ratio between 25:1 and 50:1.

*Example VII*

The formation of mixed oxides of zirconium and titanium was carried out using a reactor as described in Example VI. A bed of 100 g. of Alundum (−90 +120 mesh size) and above this 10 g. of activated wood charcoal (−20 +40 mesh size) was introduced into the reactor. The bed was fluidized by the upward flow of 1.9 liters/minute of argon and the reactor with its contents was heated to 825° C. and this temperaure was maintained throughout the run. Over a period of one hour, 18 g. of $ZrCl_4$ and 90 g. $TiCl_4$ were vaporized simultaneously into the bottom feed inlet of the reactor and 34 g. of aluminum powder were fed through the top feed inlet.

After all of the reactants had been introduced, the reactor was cooled under a continued flow of argon, and the contents of the reactor then removed. The bed material was screened and the coarser fraction was found to be of the same shaped particles as the original carbon portion of the bed, and to weigh 34.5 g. X-ray diffraction analysis showed the product to be ZrC and TiC. Chemical analysis of the product showed that 78% of the Zr values and 84% of the Ti values fed to the reactor had been recovered in the mixed carbide product.

Twenty grams of this carbide product were placed in a ceramic boat and heated in a muffle furnace following the procedure given in Example II above. The product was confirmed by X-ray analysis to be a mixture of $TiO_2$ and $ZrO_2$. The product mixed carbides was found to be comprised of particles of the same configuration as the carbon particles used in the fluidized bed reaction. Upon crushing some of these particles in mortar, acicular particles were produced.

*Example VIII*

Using the same procedure as described in the foregoing examples, an alloy of $TiAl_3$ was used as a reductant to produce a mixture of ZrC and TiC which were subsequently oxidized to form a mixture of $TiO_2$ and $ZrO_2$.

A bed of 20 g. of $TiAl_3$ alloy (−40 +60 mesh particle size) was introduced into a reactor 22 mm. I.D. and 30.5 cm. in length. This alloy had been prepared by arc-melting titanium and aluminum together and crushing the product. A 2 g. portion of activated charcoal (−20 +40 mesh) was introduced into the reactor and the bed was fluidized by the upward flow of 1.0 liter per minute of argon. The temperature was brought to 825° C. and held at this point for the duration of the run. Over a period of one hour, 20 g. of $ZrCl_4$ were introduced into the reactor. After cooling and emptying the reactor, 11.5 g. of the coarser fraction of the bed material were recovered. This product was found to be in the shape of the carbon particles charged to the reactor, and X-ray diffraction analysis showed the product to be mixed carbides of zirconium and titanium. The mixed carbide product was then oxidized according to the procedure given in Example VII, and the product was found to be a mixture of the oxides of Ti and Zr in the same configuration as the carbon particles placed in the reactor. Light crushing of these particles resulted in acicular particles of oxides.

*Example IX*

This example will illustrate the formation of titanium oxide in the form of woven material.

The same procedure was followed as is given in Example V, except that, instead of graphite batting, a piece of graphite cloth derived by carbonizing cellulose woven fibers was suspended in the reactor above the Alundum bed. As in Example V, the Alundum bed was fluidized and the reactor heated to 800° C. $TiCl_4$ and Al were fed in the amounts stated. At the conclusion of the 1-hour run, the bed was cooled, and the piece of woven cloth was removed. The fibers were found to be completely transformed to TiC while the woven texture of the cloth remained. This TiC product was then placed in a ceramic boat and heated in a muffle furnace vented to the air. The temperature was raised to about 500° C. At this temperature, the sample began to glow and continued to glow as oxidation proceeded. The temperature was increased to 1000° C. to insure complete oxidation of the sample. The time for this oxidation of the TiC to $TiO_2$ was about ½ hour, and the product recovered was $TiO_2$ in the woven texture of the carbon batting which was initially placed in the reactor.

In some of the examples which are given to illustrate the operation of this invention, it will be noted that activated carbon of particle size −20+40 mesh has been used, and that when this carbon has by intermediate reactions been transformed to metal oxide or oxides and these oxide particles crushed, acicular metal oxide particles with length-to-diameter ratios of about 25:1 to 50:1 resulted. It is pointed out that it is possible to vary the length-to-diameter ratio of the acicular oxide particles produced by varying the mesh size of the carbon used in the reactor at the start-up of the operation.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for producing metal oxides in a predetermined structural form comprising reacting at temperature of 700 to 950° C. in an enclosed reaction zone carbon in the structural form desired in the oxide, a vaporous halide of a metal selected from the group consisting of chromium, columbium, iron, molybdenum, tantalum, titanium, tungsten, vanadium, and zirconium, and an amount of a reducing agent in excess of the stoichiometric quantity required to completely reduce said halide to metal, said reducing agent being selected from the group consisting of aluminum, hydrogen, and combinations thereof when the metal selected is from the group consisting of columbium, iron, molybdenum, tantalum, tungsten and vanadium, and being selected from the group consisting of aluminum and combinations of aluminum with hydrogen when the metal selected is from the group consisting of chromium, titanium and zirconium, to produce a metal carbide, contacting the metal carbide with oxygen, at a temperature of 500 to 1000° C. to cause an exothermic reaction, and recovering a metal oxide having the structural form or the carbon reactant.

2. The process of claim 1 in which the halide it titanium tetrachloride.

3. The process of claim 1 in which the halide is zirconium tetrachloride.

4. The process of claim 1 in which the halide is tungsten hexachloride.

5. A process for producing a metal oxide in a predetermined structural form comprising passing a vaporous halide of a metal selected from the group consisting of chronium, columbium, iron, molybdenum, tantalum, titanium, tungsten, vanadium, and zirconium, through a fluidized bed containing inert particles in the lower portion of said bed and, in the upper portion of said bed, carbon having the shape desired in the oxide product while introducing an amount of a reducing agent in excess of the stoichiometric quantity required to completely reduce said halide to metal, said reducing agent being selected from the group consisting of aluminum, hydrogen, and combinations thereof when the metal selected is from the group consisting of columbium, iron, molybdenum, tantalum, tungsten and vandium, and being selected from the group consisting of aluminum and combinations of aluminum with hydrogen when the metal selected is from the group consisting of chromium titanium and zirconium, said reducing agent being introduced to said bed while maintaining the bed at a temperature in the range of 700 to 950° C. to produce a metal carbide, contacting the metal carbide with oxygen at a temperature of 500 to 1000° C. to cause an exothermic reaction, and recovery a metal oxide having the structural form of the carbon used in said bed.

6. The process of claim 5 in which the halide is titanium tetrachloride.

7. The process of claim 5 in which the halide is zirconium tetrachloride.

8. The process of claim 5 in which the halide is tungsten hexachloride.

9. A process for producing a metal oxide in a predetermined structural form comprising placing carbon having the shape desired in the oxide above a bed of inert particles maintained in a reaction zone, passing a vaporous halide of a metal selected from the group consisting of chromium, columbium, iron molybdenum, tantalum, titanium, tungsten, vanadium, and zirconium through said bed while introducing an amount of a reducing agent in excess of the stoichiometric quantity required to completely reduce said halide metal, said reducing agent being selected from the group consisting of aluminum, hydrogen, and combinations thereof when the metal selected is from the group consisting of columbium, iron, molybdenum, tantalum, tungsten and vanadium, and being selected from the group consisting of aluminum and combinations of aluminum with hydrogen when the metal selected is from the group consisting of chromium, titanium and zirconium, said reducing agent being introduced to said bed while maintaining the bed at a temperature in the range of 700 to 950° C. to convert the carbon to a metal carbide, contacting the metal carbide with oxygen at at temperature of 500 to 1000° C. to cause an exothermic reaction, and recovering a metal oxide in the shape of the carbon initially placed above the bed.

10. The process of claim 9 in which the halide is titanium tetrachloride.

11. The process of claim 9 in which the halide is zirconium tetrachloride.

12. The process of claim 9 in which the halide is tungsten hexachloride.

References Cited by the Examiner

UNITED STATES PATENTS

| | | | |
|---|---|---|---|
| Re. 21,726 | 2/40 | Kinzie et al. | 23—224.1 |
| 2,270,527 | 1/42 | Kinzie et al. | 23—140 X |
| 2,532,295 | 12/50 | Gardner | 23—208 |
| 2,760,846 | 8/56 | Richmond et al. | 23—202 |
| 2,828,187 | 3/58 | Evans et al. | 23—202 |
| 3,024,089 | 3/62 | Spencer et al. | 23—200 X |

FOREIGN PATENTS 1,088,863   9/60   Germany.

OTHER REFERENCES

Campbell et al.: "Transactions of the Electrochemical Society," vol. 96, No. 5, November 1949, pages 318–333.

Schwarzkopf et al.: "Refractory Hard metals," The Macmillan Co., New York, 1953, pages 59, 60, 130 and 148.

MAURICE A. BRINDISI, *Primary Examiner.*